(12) United States Patent
McLaughlin et al.

(10) Patent No.: US 9,458,678 B2
(45) Date of Patent: Oct. 4, 2016

(54) THREADLESS TORQUE CONNECTOR (71) Applicant: Impact Guidance Systems, Inc., Spring, TX (US)

(72) Inventors: Stuart McLaughlin, Magnolia, TX (US); Roxanne R. Dahse, New Waverly, TX (US); Raymond Kolar, Spring, TX (US); Jeremy Ramirez, Conroe, TX (US); Cameron Griffin, Katy, TX (US); Dan Katen, New Waverly, TX (US)

(73) Assignee: UNMANNED AD-HOC INDUSTRIES, INC., Spring, TX (US)

( * ) Notice: Subject to any disclaimer, the term of this patent is extended or adjusted under 35 U.S.C. 154(b) by 103 days.

(21) Appl. No.: 14/167,714

(22) Filed: Jan. 29, 2014

(65) Prior Publication Data
US 2015/0028585 A1 Jan. 29, 2015

Related U.S. Application Data (60) Provisional application No. 61/765,667, filed on Feb. 15, 2013.

(51) Int. Cl.
*F16L 37/14* (2006.01)
*E21B 17/046* (2006.01)
*E21B 17/20* (2006.01)

(52) U.S. Cl.
CPC ............ *E21B 17/046* (2013.01); *E21B 17/20* (2013.01); *F16L 37/148* (2013.01)

(58) Field of Classification Search
CPC ...................................... F16L 37/088
USPC ................................. 285/305, 276
See application file for complete search history.

(56) References Cited

U.S. PATENT DOCUMENTS

| | | | | | |
|---|---|---|---|---|---|
| 2,075,483 A | * | 3/1937 | Trotter | ................. | E21B 17/046 285/317 |
| 2,458,714 A | * | 1/1949 | Mahoney | ............. | F16L 37/148 285/305 |
| 3,314,694 A | * | 4/1967 | Faccou | ............... | F16L 27/0828 285/276 |
| 3,334,929 A | * | 8/1967 | Wiltse | ................... | F16L 37/148 285/305 |
| 3,420,555 A | * | 1/1969 | Faccou | ................... | F16L 21/04 285/276 |
| 3,887,222 A | * | 6/1975 | Hammond | ........... | F16L 37/088 285/307 |
| 4,052,091 A | * | 10/1977 | Bowden | ................. | F16L 37/14 285/305 |
| 4,120,520 A | * | 10/1978 | Ahlstone | ................ | E02D 5/523 285/305 |
| 4,146,252 A | * | 3/1979 | Buda | ..................... | F16L 21/002 285/305 |
| 4,186,946 A | * | 2/1980 | Snow | .................... | F16L 37/084 285/305 |
| 4,289,339 A | * | 9/1981 | Hansen | ................. | F16L 37/146 285/305 |
| 4,293,148 A | * | 10/1981 | Milberger | ............ | E21B 17/046 285/305 |
| 4,498,874 A | * | 2/1985 | Pichl | ..................... | B63H 23/34 285/305 |
| 4,697,947 A | * | 10/1987 | Bauer | ................... | E21B 17/046 285/305 |
| 5,383,694 A | * | 1/1995 | Taeuber, Jr. | .......... | F16L 37/148 285/305 |
| 6,179,347 B1 | * | 1/2001 | Dole | ..................... | F16L 37/148 285/305 |
| 6,343,813 B1 | * | 2/2002 | Olson | ................... | F16L 37/148 285/305 |
| 6,739,630 B2 | * | 5/2004 | Riedy | ................... | F16L 37/148 285/305 |
| 7,559,583 B2 | * | 7/2009 | Stoetzer | ............... | F16L 37/142 285/330 |
| 8,246,084 B2 | * | 8/2012 | Poddar | ................... | F16L 15/08 285/305 |
| 8,746,748 B2 | * | 6/2014 | Kern-Emmerich | ... | F16L 37/148 285/305 |
| 8,764,067 B2 | * | 7/2014 | Bundy | ................. | F16L 37/148 285/305 |
| 9,051,798 B2 | * | 6/2015 | Crow | .................... | E21B 34/066 |

* cited by examiner

*Primary Examiner* — David E Bochna
(74) *Attorney, Agent, or Firm* — Shawn Hunter (57) ABSTRACT

A threadless connection assembly for use in connecting two tubular members. A connection assembly includes connection portions having interlocking splines and a link lock that secures the two connection portions axially.

15 Claims, 8 Drawing Sheets

FIG. 8D

THREADLESS TORQUE CONNECTOR

BACKGROUND OF THE INVENTION

1. Field of the Invention

The present invention generally relates to the design of a mechanical assembly used in conjunction with coiled tubing and drilling tubulars for downhole operations. In particular aspects, the invention relates to devices used for connecting bottom hole assemblies together to the end of the coiled tubing or jointed pipe without the need for threaded connections, hand tools, hydraulic or mechanical make up devices, etc. It permits an end user to perform drilling and milling operations without the risk of the connection backing off, unscrewing and negates the risk of leaving the bottom hole assembly downhole. The system has two primary functions; A. at surface to eliminate the use of make-up tongs, torque wrenches, come-a-longs, load cells, or the use of hand tools to tighten the BHA together. Because there are no threads throughout the entire system therefore safety incidents such as dropped objects, injuries from hand tools, hand injuries, and the use of additional equipment and personnel at the wellhead is no longer a consideration. B. Downhole the system will eliminate the possibility of un-torquing of the assembly, parting of threads, threads salck-off/back off, etc. Remove the need for chemical locking agents such as glues or Loc-Tite compounds on threads that can also be affected by the wellbore environment.

2. Description of the Related Art

A coiled tubing bottom hole assembly (BHA) is primarily made up of check valves, disconnects, flow nozzles, hydraulic jars, mud motors, etc put together with various thread type connections; some commonly used threads are 3.5" IF, 2⅞" PAC and 1.500" AMMT. These tools are deployed to perform a number of service tasks, such as milling, drilling, circulating, jarring to remove stuck equipment, placement of devices, multi-lateral entry and high deviation/horizontal wellbore intervention to name but a few applications.

The standard design for a BHA assembly or part thereof requires a constant outside diameter relative to that of the entire BHA and a common internal diameter for passage of fluid/gas and a ball drop release mechanism in the event the BHA is stuck in the wellbore and needs to be shear-released to recover the coiled tubing or drill string. The assembly includes threaded connections at the top and bottom ends and can accommodate both internal and external fishing necks for retrieval.

The deployment of BHA's in the coil tubing and drilling industry has relied heavily on threaded connections to attach each subassembly together in order to make-up a full BHA capable of performing multiple operations simultaneously.

For decades, the oil and gas industry has used threaded connections to make up toolstrings/BHAs/MHAs. Thread fatigue can result in mechanical failure of the threads, thread wear, thread back-off, un-torque, tools lost in hole and required fishing operations to retrieve out of the well. It has also resulted in injury, as when a thread is not made up properly, specifications are not adhered to, human error, surface handing equipment failure, falling objects, etc. The connection assembly of the present invention helps eliminate human error, make up/torque specifications, etc.

SUMMARY OF THE INVENTION

The present invention provides a simple yet reliable way of solving the bottom hole assembly/motor head assembly problem associated with both coiled tubing and drilling operations using threaded connections. The connection assembly of the present invention provides the end user with a completely threadless thru-tubing connection capable of providing a through bore for fluid bypass. The connector offers a means of connection for two tubular member such as a coiled tubing/drill string connection without the need for surface make up and handing equipment such as tongs and wrenches. The connection also provides for torque on the bottom hole assembly in both clockwise and anti-clockwise directions without the possibility of the connection coming undone, unscrewing or un-torquing downhole. The connection requires only a one person operation and has a unique locking/unlocking ball ring mechanism that permits latching of multiple connections together. The same is true for unlatching once the bottom hole assembly is retrieved at surface; no wrenches or hydraulic tongs are required to unlock the connection. A simple unlocking ball ring mechanism is activated by hand to safely release the sub assemblies from each other.

BRIEF DESCRIPTION OF THE DRAWINGS

The advantages and other aspects of the invention will be readily appreciated by those of skill in the art and better understood with further reference to the accompanying drawings in which like reference characters designate like or similar elements throughout the several figures of the drawings and wherein.

DETAILED DESCRIPTION OF THE PREFERRED EMBODIMENTS

Figure 1:
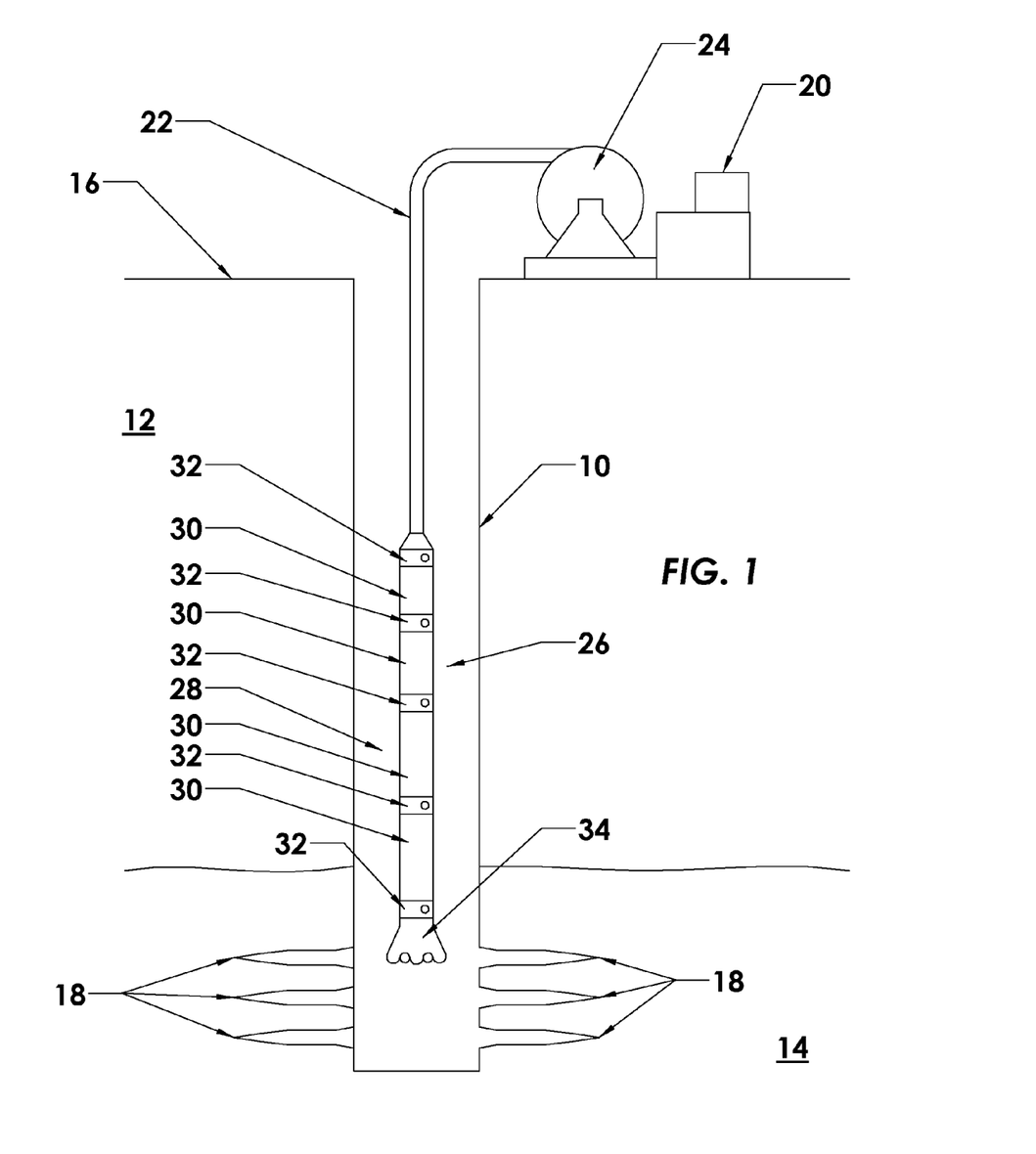
FIG. 1 is a side, cross-sectional view of an exemplary wellbore containing a bottom hole assembly with a connection system constructed in accordance with the present invention.

FIG. 1 illustrates an exemplary wellbore 10 which has been drilled through the earth 12 down to a hydrocarbon-bearing formation 14 from the surface 16. Perforations 18, of a type known in the art, extend from the wellbore 10 and outwardly into the formation 14 to permit hydrocarbon production fluid to flow from the formation 14 to the interior of the wellbore 10.

A coiled tubing injection unit 20, of a type known in the art, is located at the surface 16 and is depicted injecting a coiled tubing production string 22 from spool 24 into the wellbore 10. At the distal end of the coiled tubing string 22 is affixed a bottom hole assembly (BHA) also known as a motor head assembly (MHA) 26. An annulus 28 is defined between the bottom hole assembly 26 and the wellbore 10. It is noted that, while a coiled tubing arrangement is depicted, the devices and methods of the present invention are not limited to use within a coiled tubing system. The invention may also be used with conventional production tubing strings, of a type known in the art, which are formed of interconnected tubing string sections. In addition, the devices and methods of the present invention have application for the interconnection of two tubular member generally.

The bottom hole assembly 12 includes a plurality of subs 30 that are secured to one another in an end to end fashion by connection assemblies 32 constructed in accordance with the present invention. In addition, the bottom hole assembly 12 is affixed to the coiled tubing string 22 by a connection assembly 32. The subs 30 may include a mud motor, sensing modules or other equipment retained within tubular housings. In the depicted example, a drill bit 34 is affixed to the lower end of the bottom hole assembly 12 by a connection 32 for use in a post-fracturing milling operation.

Figure 2:
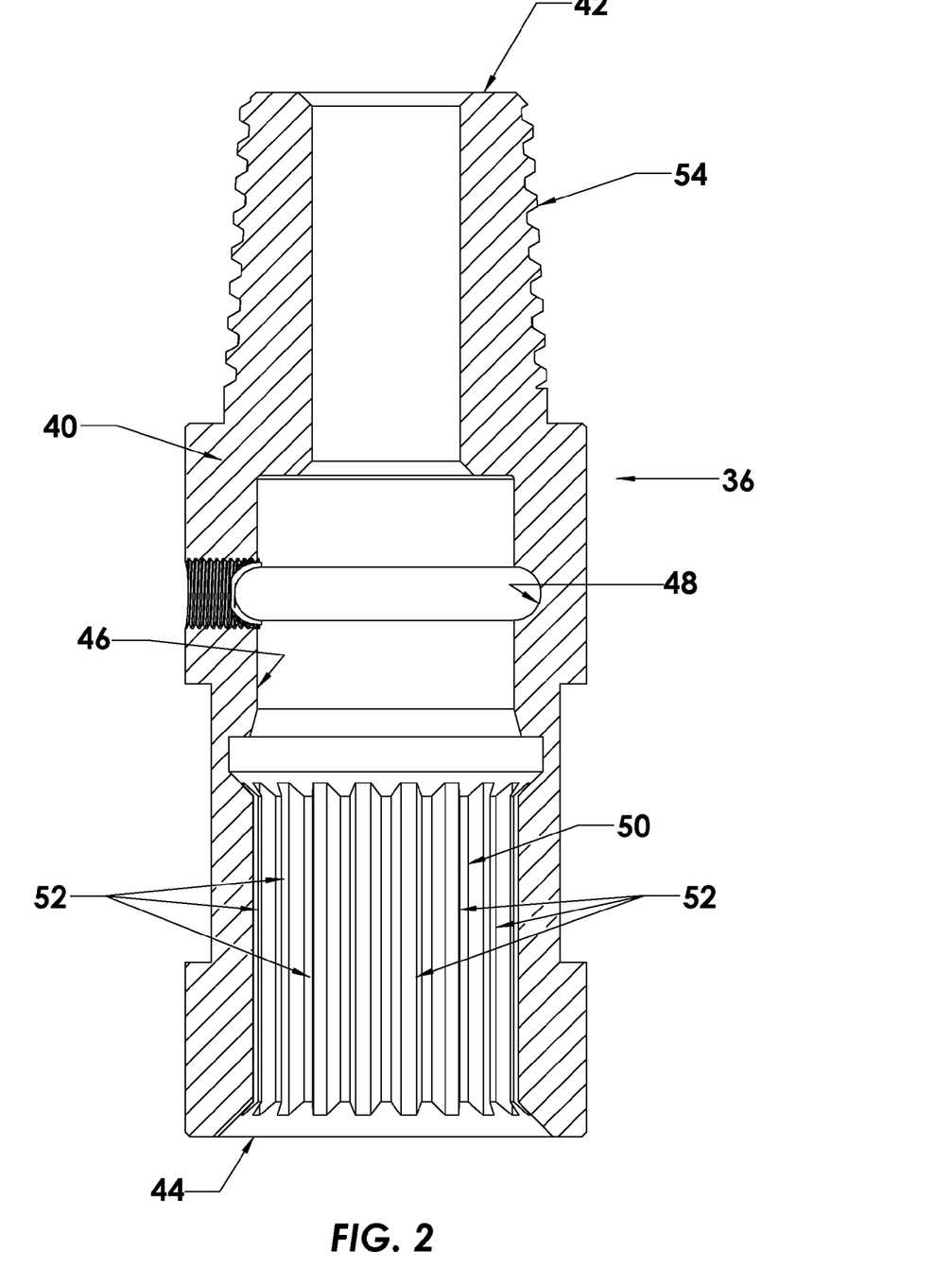
FIG. 2 is a side, cross-sectional view of a first connection portion of an exemplary connection assembly constructed in accordance with the present invention.

An exemplary connection assembly 32 is shown in greater detail in FIGS. 2-7. As shown, the connection assembly 32 includes a first tubular connection portion 36 and a second tubular connection portion 38. The first connection portion 36 is depicted in FIG. 2 and includes a generally cylindrical body 40 having an upper axial end 42 and a lower axial end 44. An axial flow passage 46 is defined along the length of the body 40 and which will be integrated into the central flow passage of the coiled tubing string 22. A radial groove 48 is formed within the axial passage 46. A spline chamber 50 is formed within the axial passage 46 and presents a plurality of inwardly-projecting splines 52 that are spaced apart from each other about the circumference of the chamber 50. In the depicted embodiment, the upper outer portion of the body 40 has a pin-type threaded portion 54 which can be used to affix the first connection portion 36 to a sub 30 or to the coiled tubing 22.

Figure 3:
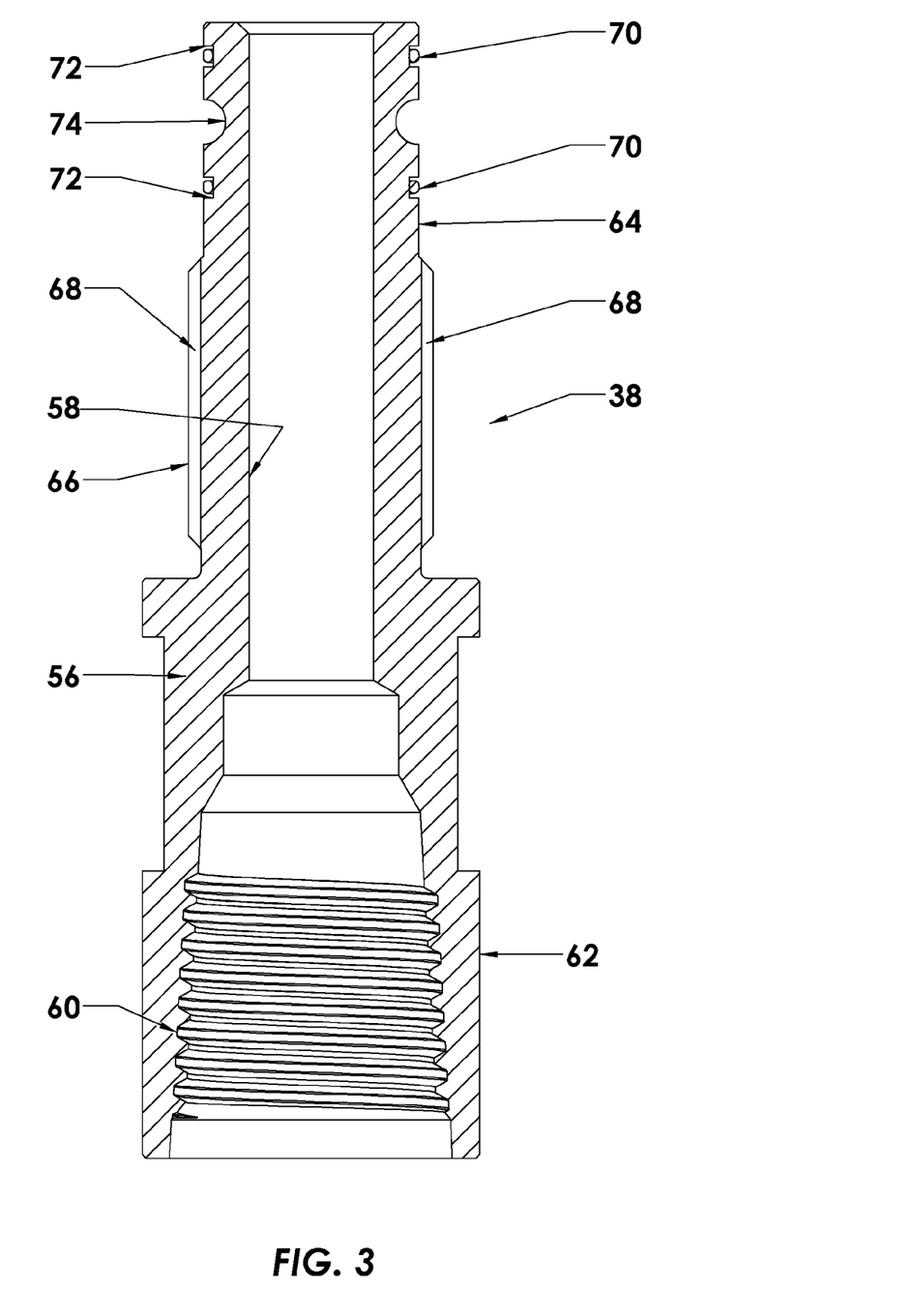
FIG. 3 is a side, cross-sectional view of a second connection portion of an exemplary connection assembly constructed in accordance with the present invention.

FIG. 3 depicts the second connection portion 38 apart from other components of the connection assembly 32. The second connection portion 38 includes a tubular body 56 which defines a central axial pathway 58. In the depicted embodiment, the lower end of the pathway 58 is threaded 60 in the manner of a box-type connection which can be used to affix the second connection portion 38 to a sub 30 or to the drill bit 34. The body 56 of the second connection portion 38 preferably includes an enlarged diameter lower portion 62 and a reduced diameter upper portion 64. The upper portion 64 includes a splined section 66 having radially outwardly projecting splines 68 which are shaped and sized to slide between and reside between the splines 52 of the first connection portion 36 in a complementary manner. Preferably, a pair of O-ring seals 70 reside within annular channels 72 on the upper portion 64. The O-rings help prevent entry of debris or unwanted material into the locking portion of the connection assembly 32. An annular groove 74 is formed within the upper portion 64 axially between the seals 70. The annular groove 74 preferably has a shape that is complementary to that of the groove 48.

Figure 4:
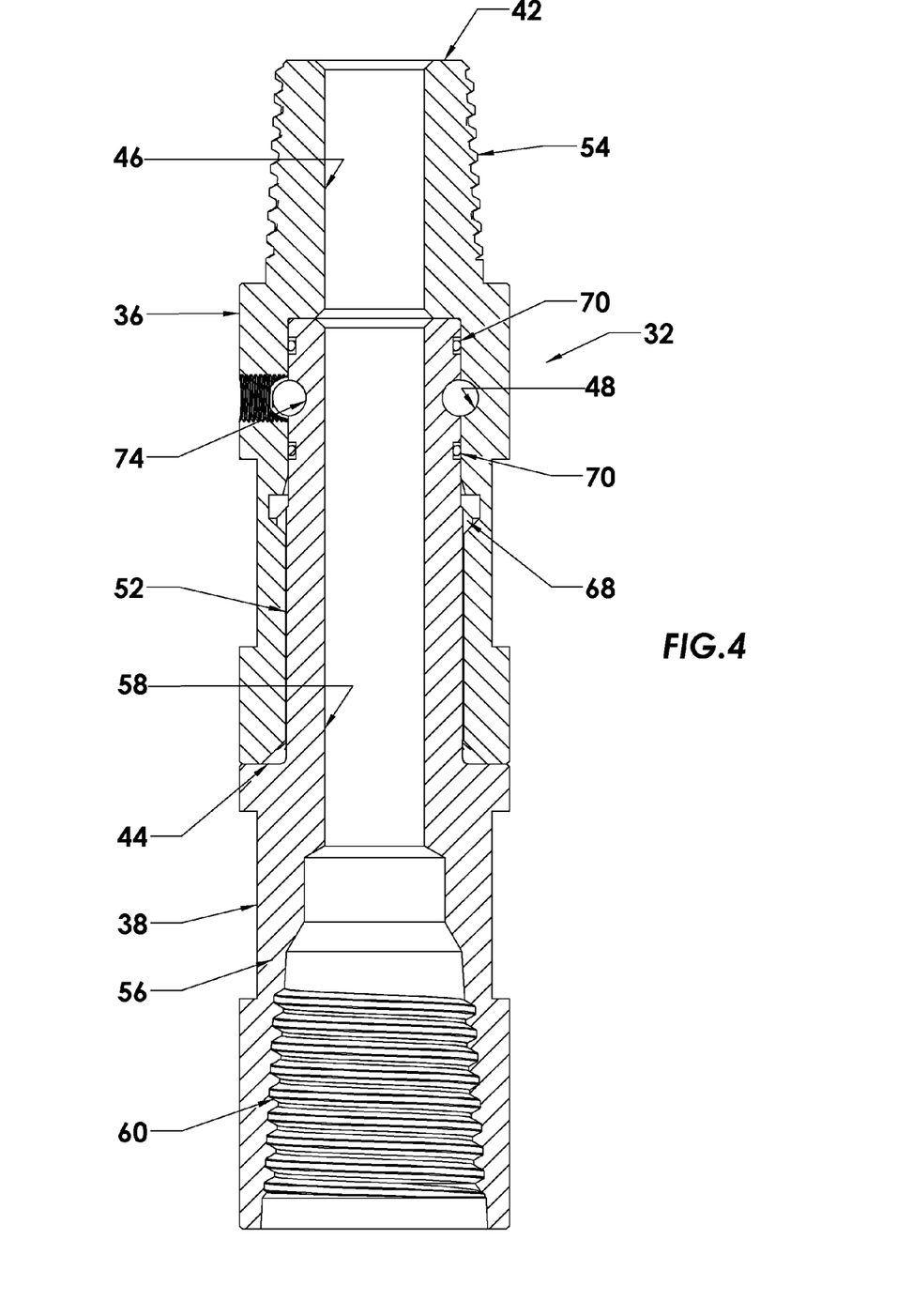
FIG. 4 is a side, cross-sectional view of the first and second connection portions having been partially assembled into a connection assembly in accordance with the present invention.

FIG. 4 illustrates the first connection portion 36 and the second connection portion 38 having been partially assembled into connection assembly 32 by inserting the second portion 38 into the first portion 36. In particular, the upper portion 64 of the second connection portion 38 is inserted into the lower end 44 of the first connection portion 36. The splines 52 of the first connection portion 36 will interlock with the splines 68 of the second connection portion 38 so that the first and second connection portions are locked against rotation with respect to one another. The O-ring seals 70 will seal against the passage 46 of the first connection portion 36.

Figure 7:
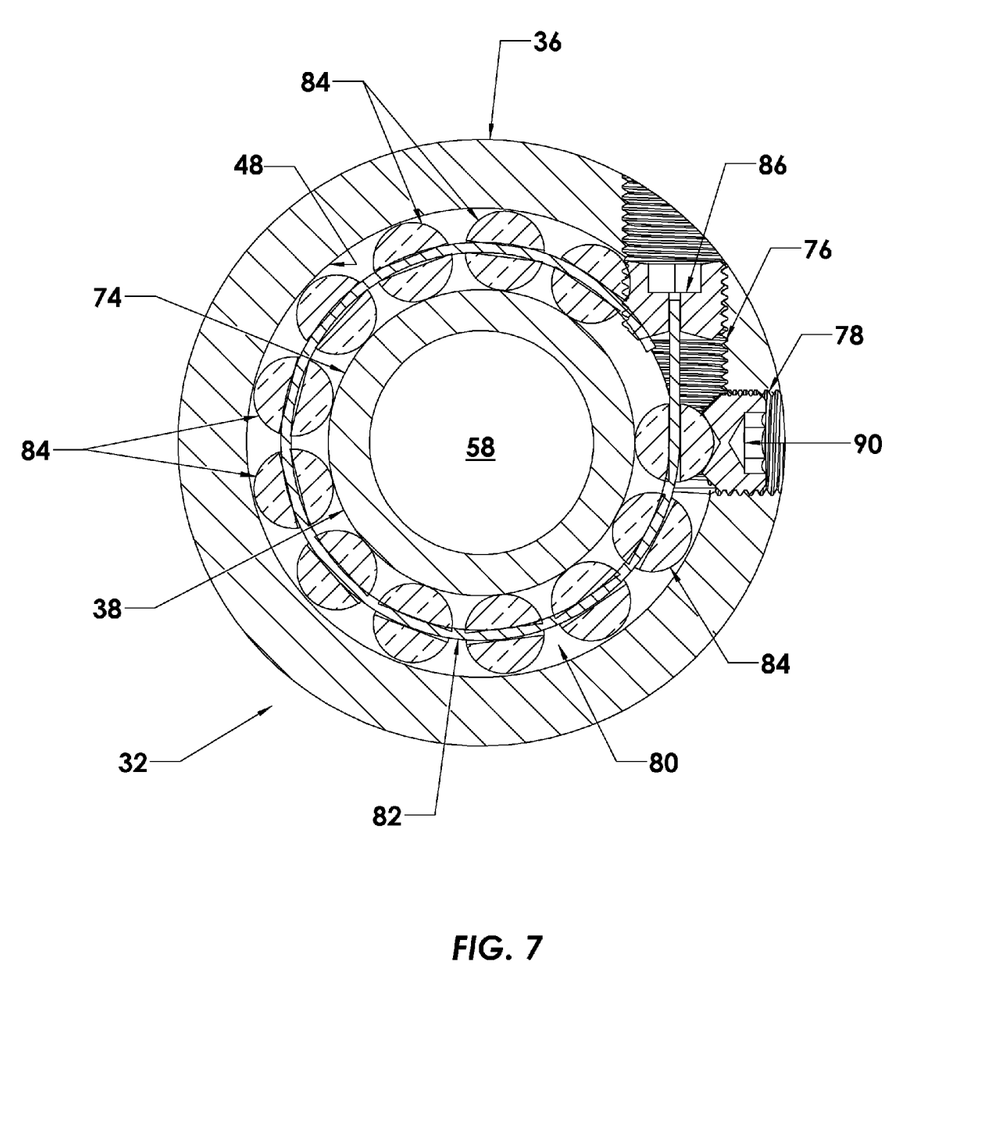
FIG. 7 is a cross-sectional view taken along lines 7-7 in FIG. 6.

It can be seen from FIG. 4 that the grooves 48, 74 are now aligned with one another in order to form an annular opening. It should be noted that the first connection portion 36 also includes a pair of lateral side openings 76, 78 which are best shown in FIG. 7.

Figure 5:
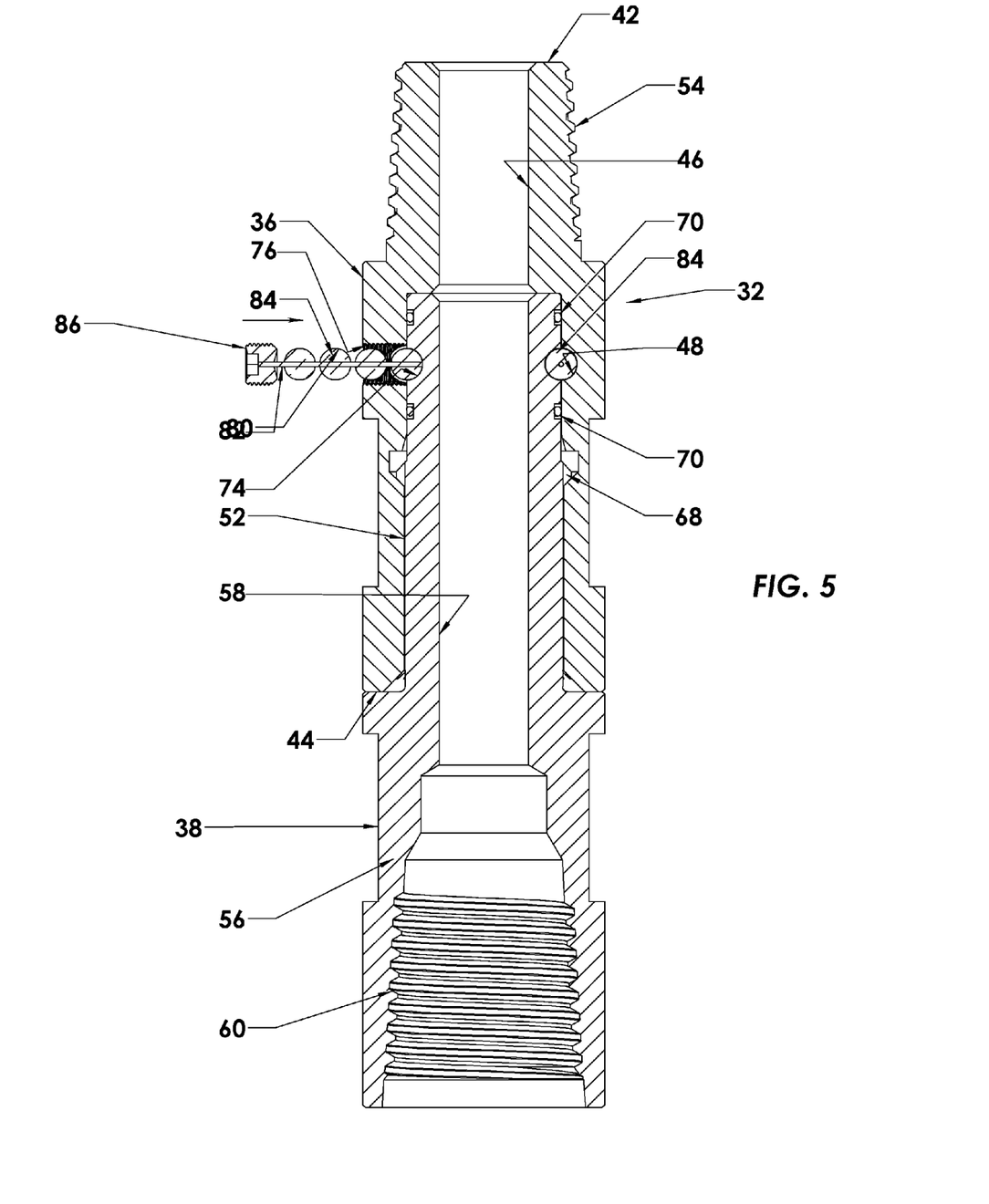
FIG. 5 is a side, cross-sectional view of the first and second connection portions now further partially assembled into a connection assembly in accordance with the present invention.
Figure 6:
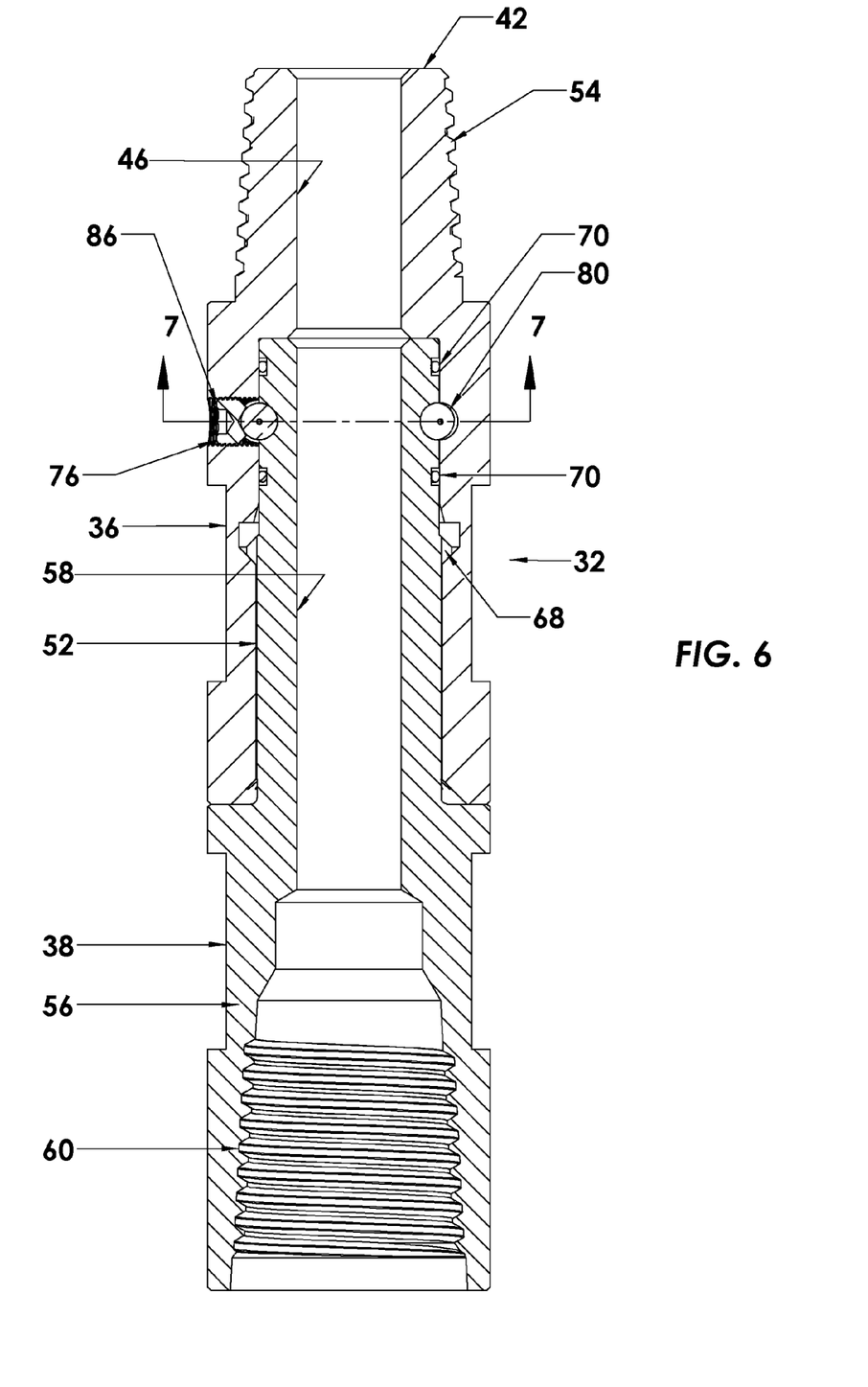
FIG. 6 is a side, cross-sectional view of the first and second connection portions having been fully assembled into a connection assembly in accordance with the present invention.
Figure 8A:
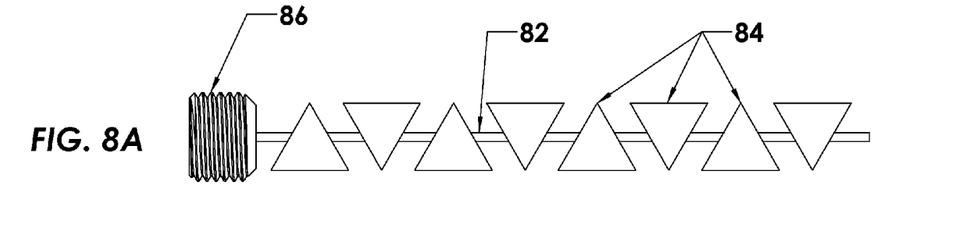
FIGS. 8A-8D depict alternative embodiments for link lock mechanisms in accordance with the present invention.
Figure 8B:
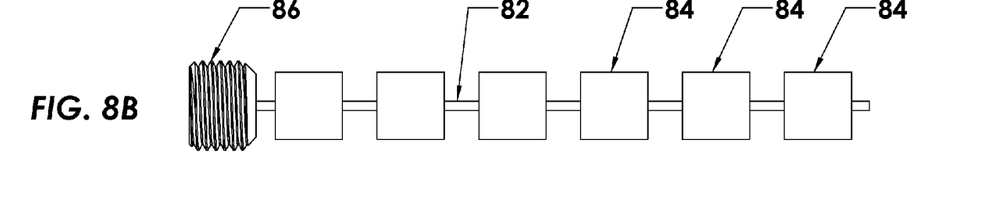
Figure 8C:
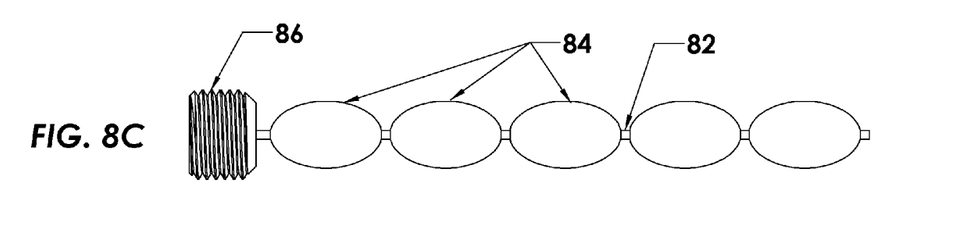

The connection assembly 32 includes a link locking mechanism to reversibly lock connection portions 36, 38 together axially. An exemplary link lock 80 is best shown in FIG. 7 and includes a flexible cable 82. As used herein, the term "cable" is meant to refer broadly to wires, chains or other flexible connecting structures. A plurality of shear-resistant members 84 are linked by the flexible cable 82. In FIGS. 5-7 the shear-resistant members 84 are spherical balls. However, other geometric shapes for the shear resistant members 84 can also be used for a suitable link locking mechanism in accordance with the present invention. FIGS. 8A-8C depict exemplary alternative embodiments wherein the shear-resistant members have a triangular shape (8A), square shape (8B), and an oblong, rounded shape (8C). Shear-resistant members having other cross-sectional shapes, including hexagonal, octagonal, etc. might also be used.

Figure 8D:
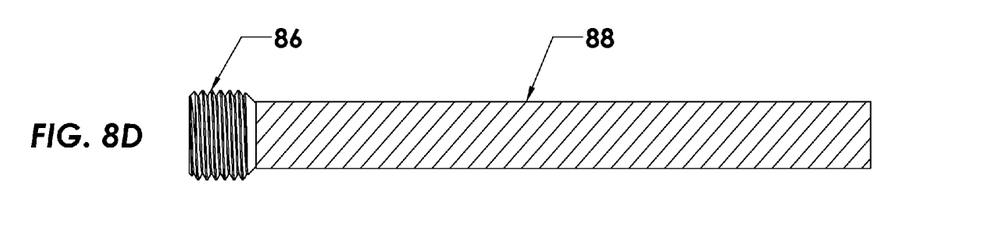

FIG. 8D illustrates an alternative embodiment for a link lock wherein the flexible cable 82 and shear-resistant members 84 have been replaced with a unitary shear-resistant member in the form of a wire 88 having a suitably sized cross-section to reside within the annular opening formed by the grooves 48, 74. The wire 88 may be solid or stranded but preferably formed of a material with a high shear strength. A securing screw 86 is also affixed to the flexible wire 82.

FIG. 5 shows the link lock 80 being inserted into the connection assembly 32 through the lateral side opening 76 manually and into the annular opening formed by the grooves 48, 74 in order to lock the connection portions 36, 38 together against axial movement. The use of the flexible cable 82 allows the link lock to be bent to conform to the shape of the annular opening formed by the grooves 48, 74 as it is inserted. FIG. 6 depicts the link lock 80 having been fully inserted and the securing screw 86 having been threaded into the side opening 76. In preferred embodiments, a set screw 90 (FIG. 7) is threaded into the lateral opening 78 to help secure the link lock 80 in place.

A plurality of mechanical and, if desired, electrical sensors can be embedded into the assembly and as is the case with the majority of MHAs the connector will have embedded dual check valves, disconnect systems, ball drop and shear release seats, etc.

In operation, the bottom hole assembly 26 will remain connected through the link locking mechanism and will not permit clockwise and anti-clockwise motion through the splined connection portions 36, 38. The threadless nature of the connection that is provided by the connection assembly 32 allows an operator to make up a connection quickly and without the need for wrenches or other tools.

When the bottom hole assembly 26 is retrieved from the wellbore 10, the ball link locking mechanism is unlocked by hand via a set screw and rotational clip and the sub assembly becomes detached from each other by pulling the link lock mechanism 80 outward for release of the connection portions 36, 38.

The first and second connection portions 36, 38 have been illustrated as having threaded portions 54, 60 for attachment of the connection portions 36, 38 to coiled tubing, subs or other tubular components. However, it should be understood by those of skill in the art that the first and second connection portions might be integrated into a sub or drill pipe section or other tubular member so that such components might be easily and quickly made up or disassembled. A connection assembly in accordance with the present invention can be manufactured with standard coiled tubing or drill pipe thread to one end and a standard connection to the other to permit cross-over to industry standard equipment such as mud motors and to allow for quick connection of heavy equipment to an existing BHA.

Those of skill in the art will recognize that numerous modifications and changes may be made to the exemplary designs and embodiments described herein and that the invention is limited only by the claims that follow and any equivalents thereof.

What is claimed is:

1. A connection assembly for use in connecting a pair of wellbore tubular members in an end-to-end fashion, the connection assembly comprising:
   a first connection portion having a body with a first annular groove;
   a lateral side opening formed within the first connection portion;
   a second connection portion having a body that can be assembled with the first connection portion, the second connection portion having a second annular groove that will align with the first annular groove to form a generally annular opening;
   a link lock that is removably disposable within the annular opening to lock the first and second connection portions together axially; and
   the link lock further comprising an integral securing screw which is threaded into and completely received within the lateral side opening to secure the link lock within the generally annular opening; and
   a set screw that is threaded into a lateral opening in the first connection portion to contact and secure the link lock in place within the generally annular opening.

2. The connection assembly of claim 1 wherein:
   the first connection portion has a splined section which presents a plurality of splines;
   the second connection portion has a splined section with a plurality of splines; and
   wherein the splines of the first connection portion become interlocked with the splines of the second connection portion when the connection portions are assembled so that the first and second connection portions are locked against rotation relative to each other.

3. The connection assembly of claim 1 wherein the link lock comprises a plurality of shear-resistant members that are flexibly connected together.

4. The connection assembly of claim 3 wherein the shear-resistant members are spherically shaped.

5. The connection assembly of claim 3 wherein the shear-resistant members are flexibly connected together by a cable that passes through each of the shear resistant members.

6. The connection assembly of claim 1 wherein the link lock is inserted into the annular opening through the lateral opening.

7. The connection assembly of claim 1 wherein at least one of the first and second connection portions includes a threaded connector for affixing the connection portion to a threaded wellbore tubular.

8. The connection assembly of claim 1 wherein the link lock comprises a flexible wire.

9. A connection assembly for use in connecting a pair of wellbore tubular members in an end-to-end fashion, the connection assembly comprising:
   a first connection portion having an annular body which defines a central bore having a first annular groove formed therein;
   a second connection portion having a body which presents an outer radial surface having a second annular groove formed therein;
   wherein the first and second annular grooves are aligned to form a generally annular opening when the outer radial surface of the second connection portion is disposed within the central bore of the first connection portion;
   a link lock that is removably disposable within the annular opening to lock the first and second connection portions together axially, wherein the link lock comprises:
   at least one shear-resistant member;
   a cable which passes through the at least one shear-resistant member; and
   a securing screw affixed to the cable for securing the link lock within the generally annular opening, the securing screw being threaded into and completely received within the lateral side opening to secure the link lock within the generally annular opening; and
   a set screw that is threaded into a lateral opening in the first connection portion to contact and secure the link lock in place within the generally annular opening.

10. The connection assembly of claim 9 wherein:
    the first connection portion has a splined section which presents a plurality of splines;
    the second connection portion has a splined section with a plurality of splines; and
    wherein the splines of the first connection portion become interlocked with the splines of the second connection portion when the connection portions are assembled so that the first and second connection portions are locked against rotation relative to each other.

11. The connection assembly of claim 9 wherein the at least one shear-resistant member comprises a plurality of shear-resistant members that are flexibly connected together by the cable.

12. The connection assembly of claim 11 wherein the shear-resistant members are spherically shaped.

13. The connection assembly of claim 9 wherein the link lock is inserted into the generally annular opening through the lateral side opening.

14. A method of assembling a pair of tubular members having connection portions in an end-to-end fashion comprising the steps of:
    disposing a surface of a second connection portion within a bore of a first connection portion so as to align a first annular groove on the first connection portion with a second annular groove on the second connection portion and form a generally annular opening;
    inserting a link lock within the generally annular opening to secure the first and second connection portions together axially, the link lock having at least one shear-resistant members, a cable which passes through the at least one shear-resistant member and a securing screw which is affixed to the cable;

securing the link lock within the generally annular opening by threading the securing screw into a lateral side opening in the first connection portion such that the securing screw is completely received into the lateral side opening; and threading a set screw into a lateral opening in the first connection portion to contact and secure the link lock in place within the generally annular opening.

15. The method of claim 14 further comprising the step of interlocking splines on the first connection portion with splines on the second connection portion to lock the connection portions against relative rotation.

* * * * *